United States Patent [19]

Baird

[11] 4,424,131

[45] Jan. 3, 1984

[54] LIQUID-LIQUID EXTRACTION METHOD AND APPARATUS

[75] Inventor: James L. Baird, Winchester, Mass.

[73] Assignee: Artisan Industries Inc., Waltham, Mass.

[21] Appl. No.: 970,543

[22] Filed: Dec. 18, 1978

[51] Int. Cl.³ .................. B01D 11/04; C10G 21/30
[52] U.S. Cl. ................................. 210/634; 422/257
[58] Field of Search .............. 210/21, 83, 513, 515, 210/521, 511, 104, 138–39, 634; 422/257; 208/8 LE, 11 LE; 260/705

[56] References Cited

U.S. PATENT DOCUMENTS

| | | | |
|---|---|---|---|
| 2,609,277 | 9/1952 | McNamara | 422/257 |
| 2,852,349 | 9/1958 | Hicks et al. | 422/257 |
| 2,919,978 | 1/1960 | Mapes | 422/257 |
| 3,178,268 | 4/1965 | Lindström | 422/257 |

FOREIGN PATENT DOCUMENTS 2330428  6/1977  France .................... 210/21

Primary Examiner—Frank A. Spear, Jr.
Attorney, Agent, or Firm—Richard P. Crowley

[57] ABSTRACT

A liquid-liquid extraction method and apparatus, which method comprises sequentially pulsing the light and heavy phases and controlling the operation of the valves which introduce into and withdraw from the column the liquid phases, based on the percent of phase-volume changes occurring in the liquid-liquid extraction in the column.

18 Claims, 1 Drawing Figure

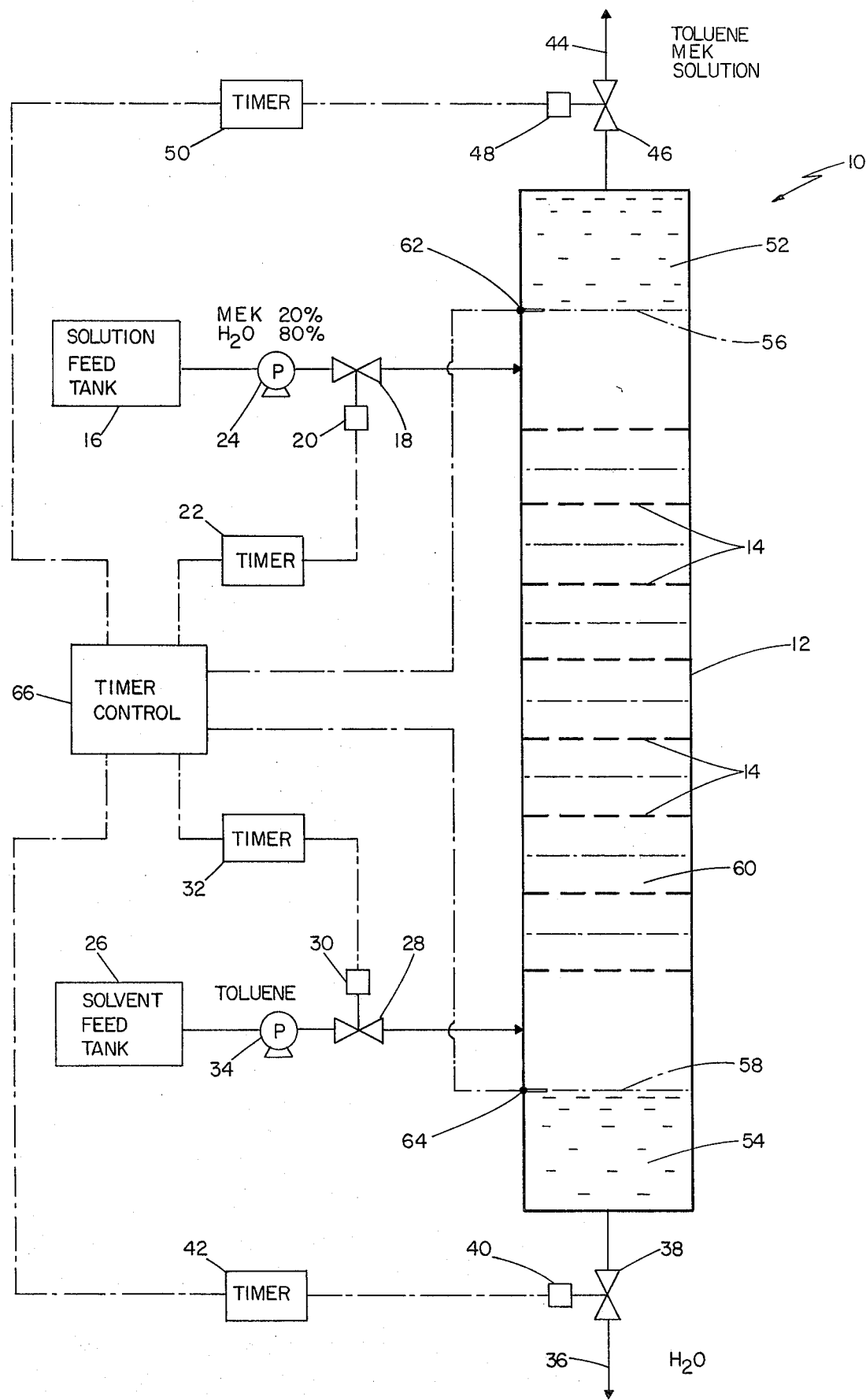

LIQUID-LIQUID EXTRACTION METHOD AND APPARATUS

BACKGROUND OF THE INVENTION

Liquid-liquid extraction techniques provide for the extraction of a liquid from a solution by intimate contact of that solution typically in a countercurrent manner and typically in an extraction column containing means to promote intimate contact of the solution with another solution in which one or more components of the first solution are preferentially soluble, and which second solution is immiscible with the first solution or at least only partially of limited solubility therein. By repeated and intimate contact of the first and second solutions; for example, in a column containing sieve trays, wherein one solution may be the heavy phase, such as a solution of methyl ethyl ketone and water, and the second solution is the light phase, such as toluene, whereby, by intimate mixing of the heavy phase as it passes downwardly in the column with the light phase as it passes upwardly in the column, extraction of the methyl ethyl ketone by the toluene is accomplished with a methyl ethyl ketone-toluene solution removed from the top of the column and the material or by-product water removed from the bottom of the column. The liquid-liquid extraction apparatus and techniques are well known and have been used in the past (see, for example, "Selection Criteria for Liquid-Liquid Extractors," *Chemical Engineering*, Nov. 6, 1978, pp. 109–117). However, the practical efficiency of liquid-liquid extraction apparatus and methods and difficulties associated with scale-up problems has limited the widescale adoption of liquid-liquid extraction as a chemical-separation technique.

In liquid-liquid extraction methods, the heavy phase is referred to as that phase which flows downwardly in the extraction column; that is, the phase of greater density, and the light phase is that phase which flows upwardly in the extraction column; that is, the phase of less density. In liquid-liquid extraction columns, the columns typically contain a plurality of trays and/or packing material, such as, for example, a series of columns containing packing material or a column containing a plurality of sieve trays, which provide for the intimate mixing of the heavy and light phases on the surface of each tray.

Numerous techniques have been tried in order to increase the efficiency of liquid-liquid extraction techniques. For example, pulsing of the phases in the column, to provide the intimate mixing of liquid and vapor on trays, has been suggested to improve the efficiency of separation processes (see, for example, the *Oil and Gas Journal*, July 28, 1952, pp. 268–271, 318–319, "Distillation, Absorption, and Extraction Column," M. R. Cannon). In addition, controlled-time cycling has been suggested for extraction columns in order to improve the capacity and efficiency of a column. In such suggested techniques, both the heavy and light phases feeding into the column were fed continuously and then were pulsed through the pulsing of the entire volume of the column. This technique required the employment of very large pumps. In addition, it causes a drop in the interface between the light and heavy phases past some of the trays employed in the column; that is, as the column is pulsed, the interface of the system drops, due to what is referred to as a "gap", but which in essence is caused by phase-volume depletion; that is, phase volume decrease or increase of the respective phases (see *The Canadian Journal of Chemical Engineering*, Vol. 19, February 1971, pp. 95–104, "Controlled Cycling Extraction," C. R. Darsi and J. E. Feick).

Thus, in the past, previous attempts, to utilize liquid-liquid extractors and techniques effectively, have been cumbersome, complicated and expensive and not wholly successful. One particular problem associated with liquid-liquid extraction techniques arises because, by definition, material is extracted from one phase to another phase; that is, from the light to the heavy or from the heavy to the light phase. This extraction causes phase-change-volume depletion and phase-volume decrease or buildup in the respective phases. As in the controlled-cycling extraction technique of Darsi et al. (supra), if no correction of this change in phase volume occurs, then the phase interface drops or moves upwardly, leading to reduced efficiency of the column.

Attempts have been made to overcome phase-volume depletion and buildup by interrupting the liquid-liquid extraction operation periodically and adding or recycling the depleted phase through the extractor, while draining out and removing the buildup or increase in phase. This technique is detrimental to continuous operation and is quite cumbersome. Attempts have been made to solve the problem by employing a third fluid, such as the use of a gas, such as inert nitrogen, to make the necessary corrections in phase volume. Therefore, there exists a need to improve liquid-liquid extraction methods and apparatus, which methods are simple, easy and effective, during operation of the liquid-liquid extraction, to control the change in phase volume occurring with such liquid-liquid extraction.

SUMMARY OF THE INVENTION

My invention relates to an improved liquid-liquid extraction method and to an apparatus for carrying out such method. In particular my invention concerns an improved liquid-liquid extraction technique and apparatus, wherein the introduction and withdrawal of liquid material is controlled in a timed manner through the opening and closing of valves, based on the precent change in the phase volume of the light and heavy phases.

My improvement will be described in connection with a typical liquid-liquid extraction system employing or containing a plurality of sieve trays. In the usual liquid-liquid extraction operation, a light phase is introduced at the bottom and the heavy phase is introduced at the top of the column, and, where a material is to be extracted from the light phase, then that material, together with the heavy phase, is removed from the top of the column, while the contaminant or other material in the light phase is removed from the bottom of the column, which, of course, may be reversed, where the liquid to be extracted is in the heavy phase. Where the material is introduced in a pulsing manner, the light material collected below each of the trays on the pulse is channeled upwardly through the holes in the tray and into intimate contact between the light and heavy phases. When the pulse stops, then the top of the tray below contains a coalescing mixture of the light and heavy phases which have been placed in intimate contact. On the pulsing of the heavy phase, the heavy phase above the tray moves downwardly through the holes in the tray and intermixes with the light phase below it, and, after the pulse has stopped, the intimate mixture of light and heavy phases coalesces between the trays. At the top and bottom of the column and on each tray, there is an interface between the immiscible light and heavy phases. If phase-change-volume depletion occurs, then, during continuous operation, the interface will drop below one or more trays, effectively reducing the efficiency of the column or vice versa on the phase buildup.

I have discovered a means, whereby the interfaces at the top and the bottom of the column, and, therefore, the interfaces intermediate the top and bottom, may be maintained relatively constant. My method provides for changes in the phase-volume change which occur in liquid-liquid extraction techniques, through the timed, pulsed introduction of the light and heavy phases into the column and through the sequential opening and closing of the valves, to introduce material into and to remove material from the column during the liquid-liquid extraction process.

In my technique, there is high liquid-liquid efficiency, since both liquid light- and heavy-phase systems are dispersed through the sieve holes of the tray, first in one direction and then in the opposite direction. Therefore, each tray in a gas-liquid contact unit becomes in essence a double tray, because there occurs movement in each direction on each tray. Such increase in efficiency permits the use of shorter columns and less trays for liquid-liquid extraction.

In addition in my technique, only one phase is flowing at any one time, and, therefore, there does not occur any flooding problem on the tray, such as when both phases are being fed continuously to the column and the entire volume of the column is then pulsed, as in the prior art. In my technique, each phase is pulsed independently of the other phase. Thereafter and while each phase is pulsing independently on the other phase, the time of impulsing is controlled in relationship to the precent phase-volume changes occurring. The amount of phase-volume changes occurring in any liquid-liquid extraction may be calculated from the light and heavy phases from the available solubility data. It is the timed pulsing of the phases and the control and maintenance of the interface and control of the interface position which permits continuous operation in the liquid-liquid extraction column, without the disadvantages of prior-art techniques.

I have discovered also that the top and bottom interfaces can be controlled through the use of interface sensors which are in communication with a timing-control means, whereby the opening and closing of the respective valves, to introduce phases to the column and withdraw phases from the column, are controlled and adjusted, responsive to the top and bottom interface position. Therefore, if minor phase depletion occurs across a particular interface, the interface then drops in the column, and the interface control will detect such change and adjust the time of opening of the respective valves, in order to maintain the interface at the same level, while the same occurs if the phase buildup occurs across the interface and the interface rises.

I have found that, to avoid the problems associated with phase-volume changes in liquid-liquid extractors; for example, to maintain an interface between light and heavy phases on each tray of a tray column, the light and heavy phases should be pulsed independently, and, during pulsation of each phase, the introduction and withdrawal of the other liquids are controlled in a timed manner; that is, to open and close the valves, controlling the flow in the column dependent on the particular phase-volume changes occurring in the liquid-liquid separation.

Thus, for example, where extraction occurs of a material from a heavy phase to a light phase, the following time sequence would occur in my invention: The heavy phase is introduced into the top or top section of the column in a pulse, and, during such pulsed time period, the valve, controlling the introduction of the heavy-feed phase at the top or the top section, is open 100% of the pulsed time. During this pulsed time, the valve, controlling the withdrawal of the heavy depleted liquid at the bottom of the tower, is open only for the percentage of time of the pulse corresponding to volume percentage of the depleted heavy phase present in the heavy-phase feed. During the balance of this heavy-phase pulse, the valve, controlling the withdrawal of the light phase containing the extracted material, is open.

After the heavy-phase pulse, a pause period is permitted to allow the phases in each section (top, bottom and between trays) to coalesce and to form a liquid-liquid interface. Following this coalescing pause period, the light-phase feed is pulsed for a predetermined time, with both valves, controlling the light phase in at the bottom and the light phase out containing the extracted material at the top of the column, being open for 100% of the light-phase pulse period.

Where extraction occurs from the light phase to the heavy phase, the valve control and time sequence are reversed.

The amount of phase change in any particular operation can be calculated from known solubility and other data and the timing sequences of the valves controlled, with typically the time period being about 2 to 15 seconds. However, as the column represents a constant volume and it is desirable to maintain the interfaces on each tray or on each packing section and to maintain a constant volume of the material to be withdrawn from the top and the material to be withdrawn from the bottom, I have found it to be desirable to add interface controls, particularly at the top and bottom interfaces in the column, which interface controls detect the movement of the position of the interfaces, and, by electrical or other communication with a control timer, then may adjust sequentially the timing of the valves to maintain the position of the interfaces within the column; thus permitting close and continuous control of the liquid-liquid extraction process.

Various interface controls may be employed, such as the displacement or buoyant-type interface controls or the differential-pressure controls, the latter of which operate by measuring the difference between the total head of both phases on a particular tray and the total head of the light or heavy phase of the tray to arrive at a pressure difference. The differential-type, pressure, interface controls, through pressure-sensitive probes in the heavy and light phases, then provide for a measurement of differential pressure, which differential pressure is maintained through adjustment of the timing of the valves and flow of the heavy and light phases to maintain the same interface.

Thus my liquid-liquid extraction method provides a continuous method also of monitoring the timing of the valves once determined or preset, so that there is no variance due to phase-volume changes in the commercial extraction process. Interface controls may be placed anywhere on the column, where an interface exists; however, for practical reasons, control of the top and/or bottom interfaces; that is, the interface of the heavy liquid at the bottom being withdrawn and the light liquid containing the light phase at the top, is usually sufficient to maintain the column in a constant-volume, stabilized, interface position.

My improved liquid-liquid extraction method and apparatus may be employed, where extraction occurs, either from the light or the heavy phase. As required in liquid-liquid extraction, one of the phases employed must be a solvent for the material to be extracted and must be only of limited solubility or immiscible with the other phase. For example, my method may be used to extract a water-soluble and hydrocarbon-soluble material from a water solution through the use of a hydrocarbon solvent, such as the extraction of an alcohol, ether, ester, ketone and the like from a water solution employing a hydrocarbon, which is a solvent for the water-soluble liquid in the water; for example, to extract a water-soluble liquid, such as an alcohol, from a heavier halohydrocarbon, such as a chlorobromohydrocarbon, such as a Freon refrigerant, employing the alcohol-contaminated Freon as the heavy phase and water as the light phase, or to extract acetone or a ketone or ester from water with toluene.

My liquid-liquid extraction method may be employed in any liquid-liquid extraction apparatus which contains therein liquid-liquid contacting means, such as all types of trays or packings or mixtures thereof, and which series or plurality of interfaces is maintained to provide for intimate mixing of the light and heavy phases and subsequent coalescence of those phases into interfaces, so as to effect the separation by liquid-liquid extraction. In particular, my method is useful in liquid-liquid extraction apparatus employing a plurality of trays, such as sieve trays, wherein trays have holes of a small size, the hole size inhibiting leakage, by virtue of the surface tension of the material from one tray to another tray, during the coalescing period, on the surface of each tray. It has been found that sieve trays, having holes of about 1/32nd of an inch, more or less are particularly suitable in preventing leakage and allowing the heavy and light phases to remain on the tray surface during coalescing periods in many systems.

The control of sequential-time intervals in a liquid-liquid extraction column can be accomplished by a simple microcomputer which provides pulsing time control for the liquid-liquid extraction column. The microcomputer functions essentially as a programmable, intelligent timer and provides extremely exact and unvarying settings for four or more sequential time intervals, which control the opening and closing of the valves, and, consequently, the flow of materials in the column. The microprocessor also may control the minute compensation required for material-composition changes, since it also may react, together with interface sensors, to both top and bottom interfaces and the movement of such interfaces. Typically a microcomputer can replace a bank of conventional timers or manual operation and avoids the individual setting of each valve timer.

My invention will be described for the purpose of illustration only in connection with a preferred embodiment. However, it is recognized that people skilled in the art may make various changes in my method and apparatus as illustrated, all fully within the spirit and scope of my invention.

BRIEF DESCRIPTION OF THE DRAWING

The drawing is a schematic illustration of the improved liquid-liquid extraction-apparatus system and method of my invention.

DESCRIPTION OF THE PREFERRED EMBODIMENTS

My improved liquid-liquid extraction apparatus and system 10 will be described in connection with the extraction of a water-soluble methyl ethyl ketone from a methyl ethyl ketone-water solution as the heavy phase, with the extracting hydrocarbon being toluene as the light phase, in which MEK is soluble and which is very limited in solubility, and which phase is immiscible with water in the heavy phase. My system 10 comprises an elongated vertical column 12 containing therein a plurality of liquid-contact sieve trays typically having very fine sieve holes of 1/32nd of an inch, which more or somewhat less retard the rapid drainage or leakage of the heavy phase therethrough, and which permit the mixture of heavy and light phases to be retained on the surface of the tray without excess leakage or drainage. The heavy phase (an 80% water, 20% methyl ethyl ketone mixture) is contained in feed tanks 16 and is introduced into the top portion of column 12 through the use of a liquid feed pump 24 and a heavy-phase feed valve 18 operated by a solenoid 20, which solenoid is actuated by a timer 22. Toluene (the light phase) is in feed tank 26 and is introduced at the bottom of the column through feed pump 34 and light-phase valve 28, which valve is operated through a solenoid 30 which is operably connected to a timer 32.

Water from the heavy phase is discharged from the bottom of the column through line 36, which is controlled by a discharge valve 38 operated by solenoid 40 which is responsive to timer 42. The light-phase liquid and the methyl ethyl ketone, as the extracted materials to form the toluene-methyl ethyl ketone solution, are discharged from column 12 through line 44 controlled by discharge valve 46 actuated by solenoid 48 and timer 50. Timers 22, 32, 50 and 42 are independently and separately shown. However, it is recognized that such timers may be incorporated into a single control system or microprocessor and incorporated into a single unit, along with timer control 66, as hereinafter described.

Solenoids 20, 30, 40 and 48 may be electric or fluid-actuated solenoids, such as, for example, air cylinders operating in response to timing commands from the respective timers. Valves 18 and 23 introduce the light and heavy phases into the columns, preferably a three-way valve, and the three-way ball valve is positioned to recirculate the light or heavy phase back to the respective feed tank, avoiding starting and stopping of the pumps during each pulse period.

As illustrated, at the top of the column, there is recovered a toluene-methyl ethyl ketone solution 52 which is immiscible with the water-methyl ethyl ketone solution introduced into the top of the column and which forms an interface 56 between the toluene-methyl ethyl ketone and the methyl ethyl ketone-water solution, while likewise, at the bottom of the column, there is shown the water 54 forming an interface 58, with the light phase of the column being introduced into the bottom of the column. Each of the sieve trays 14 in the column will contain, on the surface of the trays, also an interface between the respective light and heavy phases, which will be admixed periodically, as hereinafter described, to provide control for the accurate and careful sequential opening and closing of the respective valves through the respective timers. Interface controls 62 and 64 are disposed at the interfaces 56 and 58, respectively, and the interface controls electrically or otherwise communicate with the timer control 66, which timer control adjusts the timing of the opening and closing of each valve through the respective timers, so that the interface will remain substantially constant during the liquid-liquid extraction operation. Of course, if desired, interface controls may be placed throughout the column at other interfaces. However, control of the top and bottom of the phases is typically sufficient to control the opening and closing of the valves, to permit minor adjustments to be made during the continuous liquid-liquid extraction process, thereby avoiding periodic shutdown of the column to add or remove material.

In the operation of my improved liquid-liquid extraction system 10, the heavy-phase solution of 20% methyl ethyl ketone and 80% water is fed through from feed tank 16 through a pump by pump 24 through valve 18 into the top of the column 12 to pass downwardly through the column through the sieve trays, while toluene (the light phase) is introduced from feed tank 26 by pump 34 over valve 28 into the bottom of the column and moves upwardly, to provide for a countercurrent contacting of the liquid in the heavy and light phases. In the operation of my system, the light and heavy phases flow by impulses down and up the column 12, with the toluene extracting the methyl ethyl ketone from the water phase, while the water is removed from the bottom of the column where it collects 54 through the valve 38 in line 36, and the toluene-methyl ethyl ketone solution is removed from the top of the column 52 through valve 46 in line 44. Pulsing of the light phase; that is, toluene, into the bottom of the column is accomplished by opening the valve 28 for a predetermined time period and closing the valve through the operation of the solenoid 30 and timer 32. During the heavy-phase pulse of the water-methyl ethyl ketone into the column and downwardly, there will be an approximate 20% depletion of the water-phase volume, so that, during the timer period or pulse at which the heavy phase is being introduced through an open valve 18, the timer 22 would actuate solenoid 20 to open valve 18 for 100% of the heavy-phase pulse, while valve 38, actuated by solenoid 40 and timer 42, would be open for approximately 80% of the time of the pulse, while valve 46, actuated through solenoid 48 and timer 50, would be open for the balance of the time; that is, 20%. Then, during the pulse of the light phase and after a coalescing time period, the valves 28 and 46 would open and close together.

When the light-phase toluene is pulsed, the toluene moves upwardly through the sieve holes of the sieve trays 14 through the heavy phase on the sieve tray surfaces, to provide for intermixing of the heavy and light phases. This jetting effect of the light phase through the heavy phase gives intimate contact between the two phases. Thereafter, during a delay period, the phases are permitted to coalesce to form an interface along the sieve-tray surface. Thereafter, during the heavy phase pulse, the heavy phase on the surface of the tray is pulsed downwardly through the light phase of the tray below it to provide also intimate contact. A coalescing time delay is permitted to permit the heavy and light phases to coalesce on the surfaces of the trays and to form an interface in the described system. Both the light and heavy phases are disbursed through the tray, and each tray becomes in essence two trays, because there is movement and contact in each direction, which permits a shorter column and the use of less trays.

Also in connection with my improved liquid-liquid extraction system, there is only one phase flowing at one time; that is, first, there is a heavy or light pulse or vice versa, and, therefore, there are no flooding problems occurring where both phases will flow together or in a different manner. Each phase is pulsed independently of the other phase; however, unlike the Cannon reference, there is no need to add additional material or to withdraw additional material in order to overcome the phase-change depletion allowance, since by control of the valves so selected, by virtue of the particular change in the phase volume occurring and due to the interface control which maintains the desired balance, new material may be added or substracted, and the operation can proceed efficiently and economically.

For example, in the system illustrated, in the valving sequence and time periods required, the heavy-phase feed valve 18 is opened for a period of 4 seconds, with a 3-second pause, with all valves closed, thereafter, for coalescence, and the toluene or light-phase valve 28 is opened for a period of 5 seconds, with another 3-second pause, with all valves closed for coalescence, to provide 15 seconds for the complete cycle time, which is repeated. The total time sequence for a pulse cycle may vary; for example, from 10 to 60 seconds, with the total cycle time depending, to a great extent, on the time needed for coalescence, and the total cycle time may be greater than 60 seconds.

The operation described has been in connection with the extracting from the heavy phase; however, if extraction occurred from the light phase to the heavy phase, the valve sequence in operation would be reversed; that is, valves 18 and 38 would be opened and closed together, valve 28 would open 100% of the time, while valve 46 would open 80%, followed by the opening of valve 38 for the balance of the time. For a system wherein the heavy phase constitutes a mixture of a Freon; that is, a liquid fluorocarbon containing a water-soluble alcohol, and the light phase comprising water, then the opening and closing and the respective time periods and the pulses for the system 10 as described would be the same as for the MEK-$H_2O$ and toluene, but different times, based on different phase-volume changes, so that the time periods can be calculated. However, timer control 66 permits the respective timers to be varied slightly, depending on the position of the interface, as determined by the interface controls 62 and 64, thereby controlling and adjusting the timers through the electrical circuitry, as illustrated by the dotted lines, wherein timer control 66, through impulses received from interface controls 62 and 64, adjusts each individual timer as required, in order to maintain the same interface during the liquid-liquid extraction operation. Thus the four timers can be set for the exact and unvarying settings required, while timer control 66 provides minute compensations required for material-composition changes as they might occur during the liquid-liquid extraction system, by reacting to the electrical impulses received from the top and bottom interface controls. In effect, for example, a microcomputer is employed to replace the four conventional timers and timer control 66, as illustrated in the embodiment, to provide a signal-control system.

My improved liquid-liquid extraction system and operation provide a simple, but effective, means of operating liquid-liquid extraction columns with the advantages as described and illustrated.

What I claim is:

1. In a method of liquid-liquid extraction, which method comprises:
   (a) introducing a light-phase liquid into the bottom section of a liquid-liquid extraction column;
   (b) introducing a heavy-phase liquid into the top section of the liquid-liquid extraction column;
   (c) withdrawing a light-phase solution from the top section of the liquid-liquid extraction column;
   (d) withdrawing a heavy-phase solution from the bottom section of the liquid-liquid extraction column, wherein one of the solutions withdrawn contains material extracted from either the light- or heavy-phase liquid by the other phase, and wherein the heavy and light phases are substantially immiscible in one another, but wherein a material to be extracted in either the light or heavy phase is soluble into the other phase, so that, on contact between the light and heavy phase, as they move countercurrent in the column, a material is extracted from one phase into the other phase and is withdrawn from the column; and
   (e) pulsing separately and independently, in-sequence over a defined pulse time period, the light and heavy phases, to provide intimate mixing of the light and heavy phases as they move throughout the column countercurrent to each other, and providing a nonpulse time period of defined length between the pulsing of the light and heavy phases, to provide coalescence of the intimately mixed light and heavy phases, so as to form interfaces between the light and heavy phases after each mixing pulse, the improvement which comprises introducing the heavy phase and withdrawing the heavy-phase solution or introducing the light phase and withdrawing the light-phase solution by the opening and closing of the valves at the same time, while opening and closing the valves controlling the introduction and withdrawal of the other solution, for a time period based on the percent of phase-volume change occurring in the liquid-liquid extraction between the light and heavy phases, to provide for a continuous liquid-liquid extraction process, without substantial movement of the interfaces between the light and heavy phases during the process.

2. The method of claim 1 wherein the light phase comprises a hydrocarbon and the heavy phase comprises a solution of water and a water-soluble liquid.

3. The method of claim 2 wherein the heavy phase comprises a water-ketone solution and the light phase comprises toluene.

4. The method of claim 1 wherein the heavy phase comprises a liquid fluorocarbon-and-alcohol solution and the light phase comprises water.

5. The method of claim 1 wherein the total sequential-time sequence for the pulsing of the light and heavy phases and the coalescent period comprises from about 10 to about 60 seconds.

6. The method of claim 1 wherein the column comprises a light-phase solution at the top of the column and a heavy-phase solution at the bottom of the column, each solution forming an interface of the respective heavy and light phases and adjusting the opening and closing of the valves in response to the position of the respective top and bottom interfaces in the column, to maintain such interfaces in the positions desired in the column.

7. The method of claim 1 wherein the heavy phase is a water-methyl ethyl ketone solution introduced for a period of 4 seconds, the light phase is toluene and is introduced for a period of 5 seconds and a sequential pause between each introduction of the light and heavy phases of approximately 3 seconds, to provide for a total pulse-cycle time of approximately 15 seconds.

8. The method of claim 1 which includes detecting periodically the position of at least one interface and adjusting the timing of the opening and closing of the respective valves through the introduction and withdrawal of light and heavy phases and light- and heavy-phase solutions, in accordance with the position of one or more interfaces between such light- and heavy-phase solutions and light and heavy phases in the column, to stabilize the interface position within the column.

9. In a method for liquid-liquid extraction, wherein a light-phase and a heavy-phase liquid move countercurrently to each other in a column containing a plurality of liquid-liquid contacting trays therein, with the heavy phase introduced at the top of the column and the light phase at the bottom of the column, and wherein one phase contains a solution of extractable and non-extractable materials and the other solvent phase comprises a solution for the extraction of the extractable material from the one phase, and wherein a phase-volume change occurs during the liquid-liquid extraction method in the column, and wherein the one and the other phases are introduced, by independent sequential pulses, in the column, and wherein the nonextractable material in a depleted phase is withdrawn from one end of the column, and the extracted material in the solvent solution as an added phase is withdrawn from the opposite end of the column, and the introduction and withdrawal are controlled by time-operated and controlled valves, the improvement which comprises:
   (a) pulsing the one phase in a predetermined pulse time period, and, during the pulsing, controlling the operation of the valves, so that
      (i) the valve controlling the introduction of the phase containing the extracted material is open 100% of the pulse time period,
      (ii) the valve controlling the introduction of the other solvent phase is closed 100% of the pulse time period,
      (iii) the valve controlling the withdrawal of the depleted phase is open only for the percentage of time of the pulse corresponding to the volume percentage in the depleted phase of the extracted material, and
      (iv) the valve controlling the withdrawal of the added phase is open only during the balance of the pulse time corresponding to the volume percentage of the extracted material in the added phase;
   (b) closing all valves and allowing the admixed, pulsed phases, for a period of time, to coalesce and to form interfaces on the column trays and at the top and bottom of the column;
   (c) pulsing the solvent phase in a predetermined pulse time period and controlling the valves, so that
      (i) the valve controlling the introduction of the solvent phase and the valve controlling the withdrawal of the added phase are open 100% of the time of the pulse;

(d) closing all valves and allowing the admixed, pulsed phases, for a period of time, to coalesce and to form interfaces on the column trays and at the top and bottom of the column; and (e) repeating steps (a) through (d) during the liquid-liquid-extraction method.

10. The method of claim 9 wherein the time period of the pulsing of each phase and/or the coalescing period ranges from about 10 to 60 seconds.

11. The method of claim 9 wherein the solvent phase comprises water and the other phase comprises a solution of a fluorocarbon and alcohol.

12. The method of claim 9 wherein the solvent phase comprises a hydrocarbon and the other phase comprises a solution of water and a water-soluble ketone.

13. The method of claim 9 which includes maintaining the interfaces of the phases, at the top and bottom of the column, in a stabilized, predetermined position by sensing the position of the interfaces, and adjusting the timed opening and closing of the valves, to maintain the interface position.

14. An improved liquid-liquid extraction method, which method comprises sequentially pulsing the light and heavy phases in a liquid-liquid extraction column and controlling in a timed manner the separate, sequential and independent introduction and withdrawal of the volume of the light and heavy phases, based on the percentage of phase-volume changes which occur in the liquid-liquid extraction process between the heavy and light phases, to provide for a continuous liquid-liquid extraction process without substantial movement of the interfaces between the light and heavy phases during such liquid-liquid extraction process.

15. The method of claim 14 wherein the light phase comprises a hydrocarbon and the heavy phase comprises a solution of water and a water-soluble liquid.

16. The method of claim 15 wherein the heavy phase comprises a water-ketone solution and the light phase comprises toluene.

17. The method of claim 14 wherein the heavy phase comprises a liquid fluorocarbon-and-alcohol solution and the light phase comprises water.

18. The method of claim 14 which includes sensing the interfaces between the light and heavy phases at the top and the bottom of the column and adjusting the pulsed separate introduction and withdrawal of the light and heavy phases, to maintain both interfaces in a substantially stabilized position.

* * * * *